(12) United States Patent  (10) Patent No.: US 7,374,479 B2
Quinney et al.  (45) Date of Patent: May 20, 2008

(54) PORTABLE FISH, FOWL AND WILD GAME WORK SURFACE AND CLEANING APPARATUS

(76) Inventors: Donald C. Quinney, 9500 N. Shore Trail, Forest Lake, MN (US) 55025; Glen C. Frogner, 9341 172nd Ave. NE., Forest Lake, MN (US) 55025; Christopher F. Freudenberg, 17556 Lyons St. NE., Forest Lake, MN (US) 55025

( * ) Notice: Subject to any disclaimer, the term of this patent is extended or adjusted under 35 U.S.C. 154(b) by 16 days.

(21) Appl. No.: 11/372,362

(22) Filed: Mar. 9, 2006

(65) Prior Publication Data

US 2007/0026785 A1 Feb. 1, 2007

Related U.S. Application Data

(60) Provisional application No. 60/659,773, filed on Mar. 9, 2005.

(51) Int. Cl.
*A22C 17/00* (2006.01)
(52) U.S. Cl. ..................................... 452/185
(58) Field of Classification Search .................. None
See application file for complete search history.

(56) References Cited

U.S. PATENT DOCUMENTS

| | | |
|---|---|---|
| 3,590,423 A | 7/1971 | Messer |
| 3,785,008 A | 1/1974 | Parker |
| 4,229,858 A | 10/1980 | Baxter et al. |
| 5,098,338 A | 3/1992 | Jensen |
| 5,116,279 A | 5/1992 | Perry |
| 5,474,494 A | 12/1995 | Sims |
| 5,522,765 A | 6/1996 | Dotson et al. |
| 5,542,359 A | 8/1996 | Polries |
| 5,609,521 A | 3/1997 | Allred et al. |
| 5,622,342 A * | 4/1997 | Mills .......................... 248/126 |
| 5,649,734 A | 7/1997 | Speis |
| 5,706,740 A | 1/1998 | Keller, Jr. |
| 5,860,367 A | 1/1999 | Riegel et al. |
| 6,062,974 A * | 5/2000 | Williams ..................... 452/187 |
| 6,139,417 A * | 10/2000 | Finney ........................ 452/196 |
| 6,254,473 B1 | 7/2001 | Shore et al. |
| 2004/0094071 A1 | 5/2004 | Goeller |
| 2004/0147212 A1* | 7/2004 | Leili et al. ................... 452/173 |

* cited by examiner

*Primary Examiner*—Thomas Price
(74) *Attorney, Agent, or Firm*—Kagan Binder, PLLC (57) ABSTRACT

A compact, easy to store, portable work surface and apparatus for fish, fowl, wild game and the like that is capable of temporary mounting to a tree or other vertical support is provided that includes a work surface/cutting board attached to a support frame having an upright stanchion to extend above the work surface and provided with a lower engagement member, preferably provided as a tined or forked member to engage a surface at multiple distinct points, for engaging and preferably partly straddling a tree or other vertical support. A lanyard is operatively coupled to upright stanchion above the work surface and is adapted to be draped and secured about the tree to suspend the frame from the tree.

9 Claims, 5 Drawing Sheets

PORTABLE FISH, FOWL AND WILD GAME WORK SURFACE AND CLEANING APPARATUS

REFERENCE TO RELATED APPLICATIONS

This application claims the benefit of U.S. Provisional application Ser. No. 60/659,773, filed Mar. 9, 2005, entitled, "PORTABLE FISH, FOWL AND WILD GAME CLEANING APPARATUS," which application is incorporated herein by reference in its entirety.

TECHNICAL FIELD

The present invention relates generally to a portable cleaning apparatus useful in outdoor environments for cleaning fish, fowl and wild game and for attachment to trees, piers, fence posts or other vertical supports. More particularly, the portable cleaning apparatus provides a work surface that can be supported from a vertical support such as provided for outdoor use and disengaged to provide a work surface that may be placed on a horizontal surface as well.

BACKGROUND OF THE INVENTION

One aspect of fishing or hunting which is not considered enjoyable, however, is cleaning the fish or game that are caught by kneeling on the ground. Recreational sportsmen generally find it necessary or desirable to clean and cool their catch soon after fishing or hunting is completed in order to prevent spoilage and to maintain the freshness of the catch. In some circumstances, fish cleaning facilities are provided at the landing where the fishermen unload and load their boat off and onto a trailer used to transport the boat to the lake or river. But in many circumstances, there are no such facilities and the sportsman is faced with either waiting until he returns home to clean the catch (which is not a viable option if the time between when the fish or game is caught and the time the sportsman returns home is too long) or providing his own means of cleaning the fish or game before returning home. Moreover, even where a cleaning station is provided, often such stations are unclean from being exposed in the outdoors and from prior uses in cleaning fish and game. A number of specialized tools are available to assist in the work of cleaning fish, for example. Fish scalers and filleting knives have long been known. Cutting boards themselves are also well known, but the use of kitchen cutting boards is normally not desirable for the purpose of cleaning fish or game as they are otherwise to be used in the kitchen without stains, smells or residue that may be present from cleaning fish and game.

A number of devices have been developed which permit the sportsman to clean their catch when cleaning facilities are not provided. For example, U.S. Pat. No. 6,254,473 discloses a portable fish cleaning apparatus useful by recreational fishermen to clean their catch at the boat landing or other convenient location, where a fish cleaning board can be supported for use at a position upon placement in supportive engagement with a boat and trailer when in use.

U.S. Pat. No. 5,522,765 discloses a fish cleaning device which comprises a cleaning board with holding means for gripping a fish while it is cleaned.

U.S. Pat. No. 55,649,734 discloses a tailgate box, table and sink which is mounted on the tailgate of a pickup truck during use.

U.S. Pat. No. 55,542,359 discloses a collapsible fish cleaning table which has a tabletop member with an upwardly facing work surface which is supported by collapsible legs attached to the bottom of the tabletop member.

U.S. Pat. No. 55,860,367 discloses a portable filleting table that is supported by foldable legs.

U.S. Pat. No. 55,474,494 discloses a fish cleaning apparatus, which is adapted to be supported upon a container having an upwardly opening mouth (i.e., a garbage can). The cleaning platform has an opening which overlays the opening in the container, and the platform is releasably latched to the container when in use.

U.S. Pat. No. 55,706,740 discloses a portable tree shelf that can be used on a vertical support like a tree. However, the support structure is provided beneath the work table so that the table in not particularly usable when detached from a tree and placed on the ground or other horizontal surface.

Published Patent Application No. US2004/0094071 discloses a strap-on multi functional apparatus that can be attached to vertical support member such as a tree or pier. Again, the support structure is provided beneath the work table. Although the support structure is collapsible, the structure still gets in the way so that the table in not particularly usable when detached from a tree and placed on the ground or other horizontal surface. Moreover, with the many components and folded components, such device is cumbersome to assemble and to carry to a use site, such as by back pack.

These prior art devices are unsatisfactory because they either require other devices that are not naturally provided for support while in use (i.e., a pickup tailgate, boat and trailer or a container) or, if they provide their own means of support (i.e., legs or lower brackets), they are cumbersome to assemble, bulky, difficult to transport and are limited to uses as they are specifically supported (to a vertical support, but not on a horizontal surface like the ground).

Other references of note include U.S. Pat. No. 3,590,423 to Messer; U.S. Pat. No. 3,785,008 to Parker; U.S. Pat. No. 4,229,858 to Baxter et al; U.S. Pat. No. 5,098,338 to Jensen; U.S. Pat. No. 5,116,279 to Perry; U.S. Pat. No. 5,474,494 to Sims; U.S. Pat. No. 5,522,765 to Dotson et al; U.S. Pat. No. 5,609,521 to Alfred et al; U.S. Pat. No. 6,254,473 to Shore; and France patent no. 1486784.

SUMMARY OF THE INVENTION

A compact, easy to store, portable cleaning apparatus for fish, fowl, wild game and the like that is capable of temporary mounting to a tree or other vertical support is provided that includes a work surface/cutting board attached to a support frame having an upright stanchion to extend above the work surface and provided with a lower engagement member, preferably provided as a tined or forked member to engage a surface at multiple distinct points, for engaging and preferably partly straddling a tree or other vertical support. A lanyard is operatively coupled to upright stanchion above the work surface and is adapted to be draped and secured about the tree to suspend the frame from the tree. With this construction, the portable cleaning apparatus is suspended by the lanyard and is stabilized by the lower engagement member as it contacts a tree or other vertical support. Thus, fishermen and hunters can clean their catch at camp or at the boat landing on a stable and effective work surface. The work surface board is preferably pivotally connected to the upright stanchion of the support frame at a point below the operative connection of the lanyard to the upright stanchion. A lower frame member can be provided as fixedly connected with the work surface board, which lower frame member can be articulated to the stanchion to provide the pivotal connection at a first end of the lower frame member so that the work surface board can be rotated between an open position for use and a closed position for transport and storage. The cleaning device is also preferably provided with a connection system, such as hook and loop connectors that can be provided through one or more openings of the cutting board, so that a refuse collection member may be mounted and demounted to the work surface board, and which may further have a refuse collection bag attached for receiving refuse of fish, fowl, game or other waste from cleaning operations for the convenient disposal of such fish, fowl or game cleaning wastes. As a preferable further option, one or more knife receiving slots can be provided in the cutting board. The work surface board is preferably made from a material that is suitable for cutting on a surface thereof and that cleans easily, such as a blow-molded, high molecular weight HD polyethylene (HDPE). It is contemplated that other plastics, woods, metals, ceramics, etc. can be used as well as multiple materials constructions and/or laminates to provide the work surface. A preferred work surface board incorporates integral structural features, such as ribs and/or flanges, for additional strength. It is also contemplated that the one or more elements of the frame may be made integrally with the work support board. Other preferred polymeric materials include nylon, polypropylene, ABS and polyester, which can be used as materials for constructing one or more components of the apparatus. An attachment point for accessories can also be provided on the upright stanchion of the support frame so that any number of devices can be supported from above the work surface. For example, an adjustable beam or LCD light may be affixed to the stanchion to be directed at the work surface for added vision during night use.

DETAILED DESCRIPTION OF THE INVENTION

Figure 1:
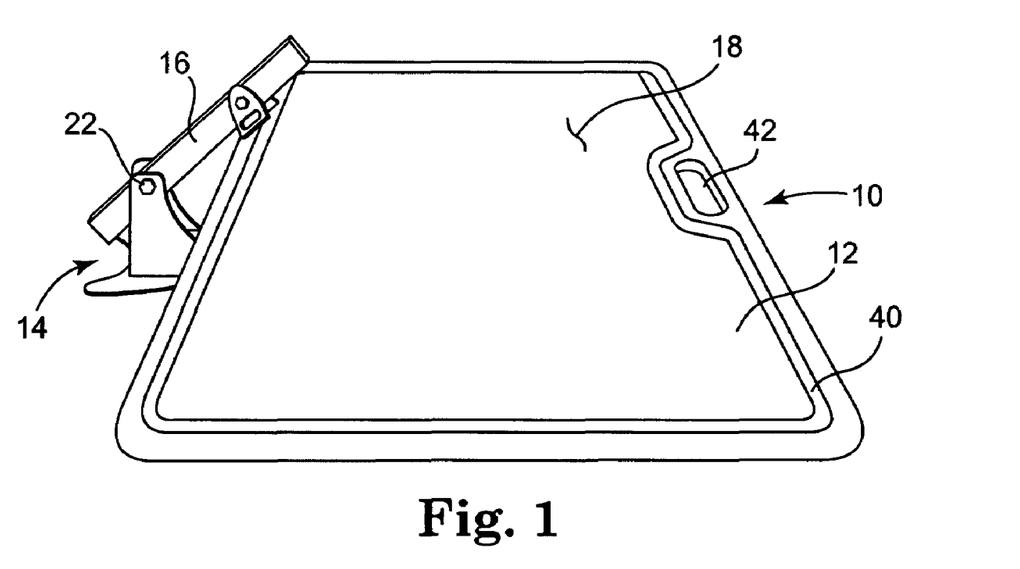
FIG. 1 is perspective view of a portable cleaning apparatus in accordance with the present invention having a work surface board and a support frame with an upright stanchion shown in a pivoted position from upright.
Figure 2:
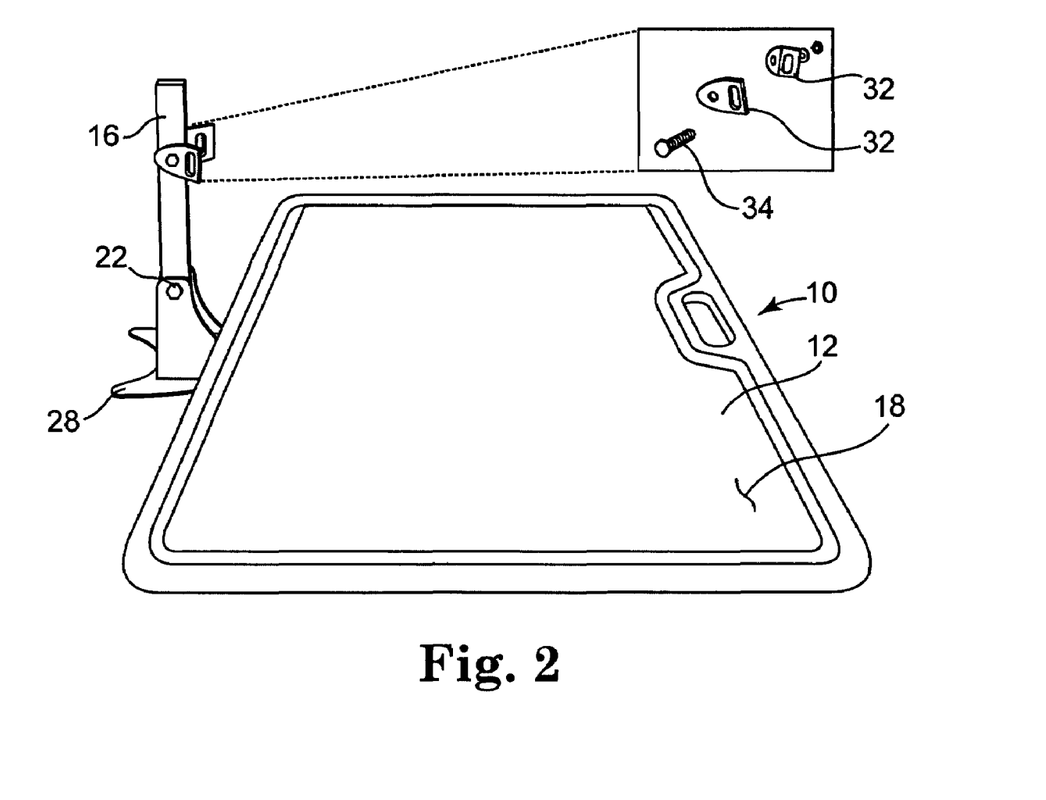
FIG. 2 is a perspective view similar to FIG. 1 but with the upright stanchion shown in an upright position, and further showing an exploded enlarged view connector elements.
Figure 3:
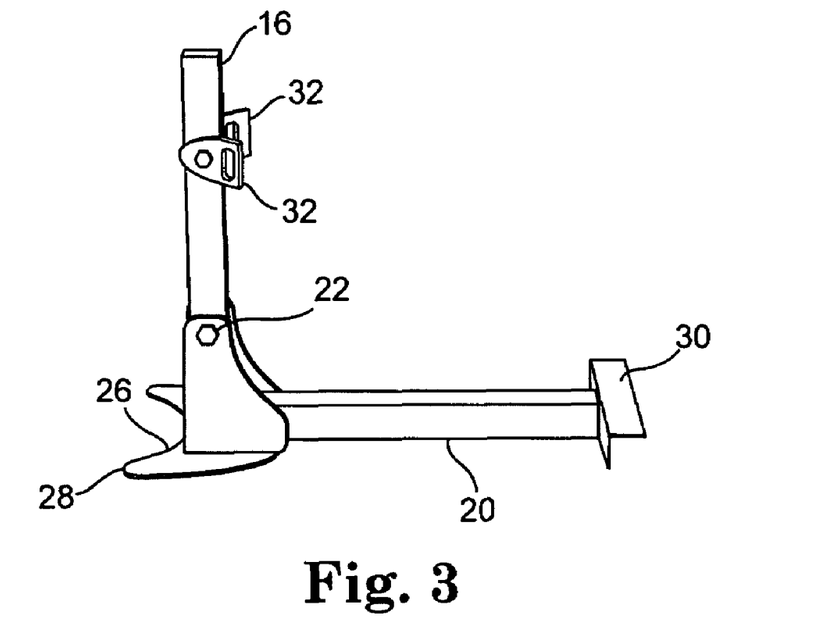
FIG. 3 is a perspective view of a stanchion usable within a portable cleaning apparatus of the present invention having a pivotal upright stanchion shown in an upright position.
Figure 4:
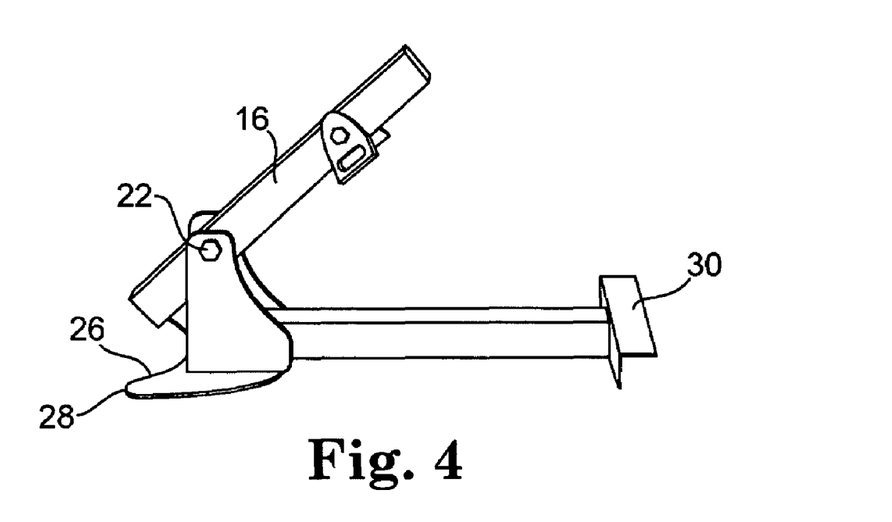
FIG. 4 is a perspective view similar to FIG. 3 of a stanchion usable within a portable cleaning apparatus of the present invention having a pivotal upright stanchion shown in a pivoted position from upright.

The present invention is directed to a compact, easy to store, portable cleaning apparatus for fish, fowl, wild game and the like that is capable of temporary mounting to a tree or other vertical support. An apparatus 10 is shown in FIGS. 1 and 2 that includes a work surface/cutting board 12 attached to a support frame 14 having an upright stanchion 16 to extend above a work surface 18 of the work surface board 12. As shown in FIGS. 3-6, a preferred frame 14 comprises the upright stanchion 16 connected with a lower frame member 20 that are preferably articulated at pivot connection 22 that permits the stanchion 16 (as shown upright in FIG. 3) to articulate forwardly as shown in FIG. 4 but that is limited from reverse pivoting, such as by an engagement of a lower portion of the stanchion 16 (below the connection point of the stanchion 16 to the lower frame portion) with a surface of the lower frame member 20. The lower frame member 20 is shown with preferable flange portions 24 to provide the pivot connection point with the stanchion 16. A conventional bolt can provide the pivot point and make the articulated connection, although any pivotal connection can be used. As part of the lower frame member, a lower engagement member 26 is preferably provided with one or more tines or forks 28 to engage a support surface at multiple distinct points, for example to engage and preferably partly straddle a tree or other vertical support. Any number of times or fork elements are contemplated including elements that are sharp, blunt or smooth to contact a support surface. Pointed tines are preferred for the application of the subject invention for use on trees.

At the distal end of the lower frame member from engagement member 26, a mounting flange 30 is preferably provided to facilitate mounting of the work surface board 12. Mounting holes can be used to permits screws, bolts, or the like to fasten the work surface board 12 in place as provided through the flange 30 and/or through other structural elements of the lower frame member 20 in alignment with holes through the work surface board 12. Other types of fasteners and connectors are contemplated including adhesives, mechanical fasteners, other bonding techniques, and the like. Preferably, the connection between the lower frame member 20 and the work surface board 12 permits the work surface board 12 to be removable for repositioning at a different orientation if desired or to replace the work surface board 12. With appropriate fasteners and alignment of mounting features, the work surface board 12 can be rotated, for example, by 90 degrees so that the length of the work surface board 12 extends in the same direction of extension as the lower frame member 20 instead of across the lower frame member 20 as illustrated in FIG. 2.

Figure 5:
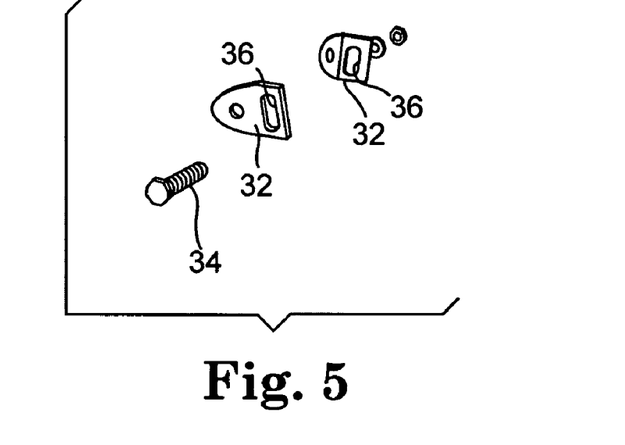
FIG. 5 is a perspective exploded view of connector elements for connection through an opening of the stanchion.
Figure 6:
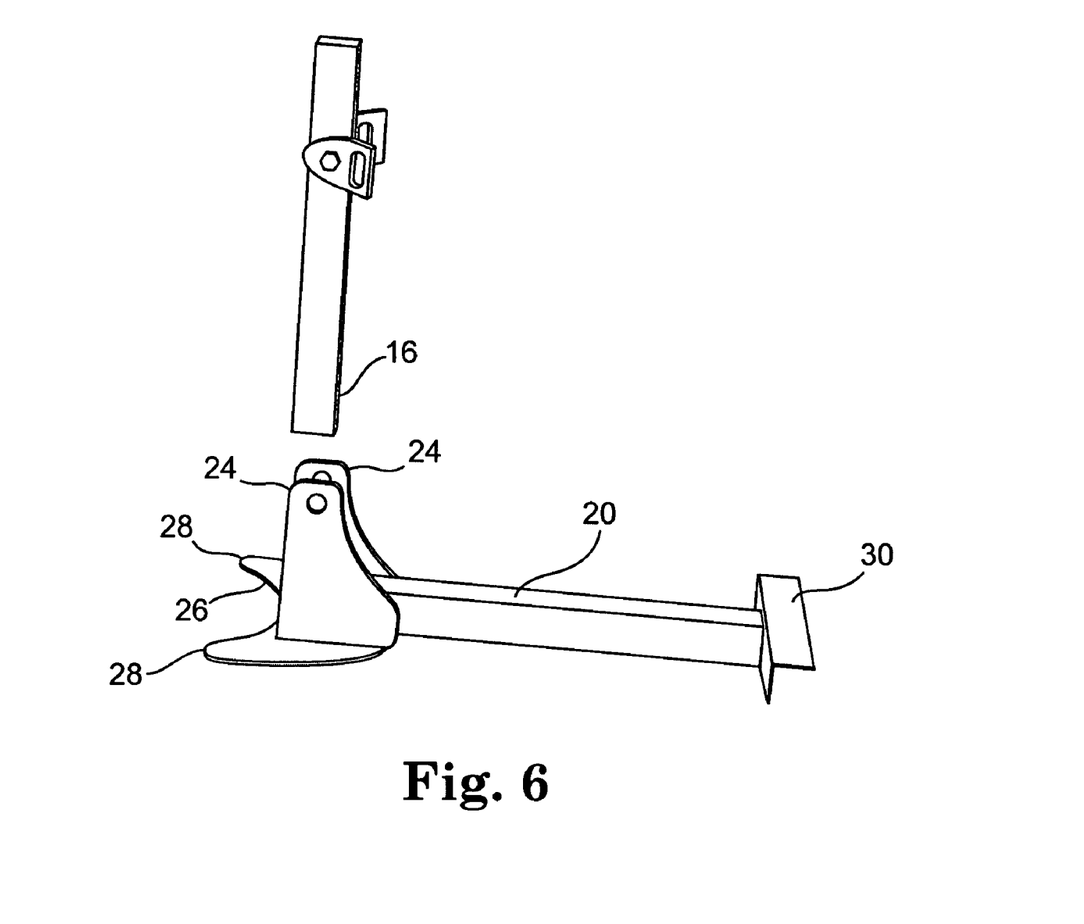
FIG. 6 is a view of stanchion of FIGS. 3 and 4 with the stanchion separated from a lower frame member.
Figure 7:
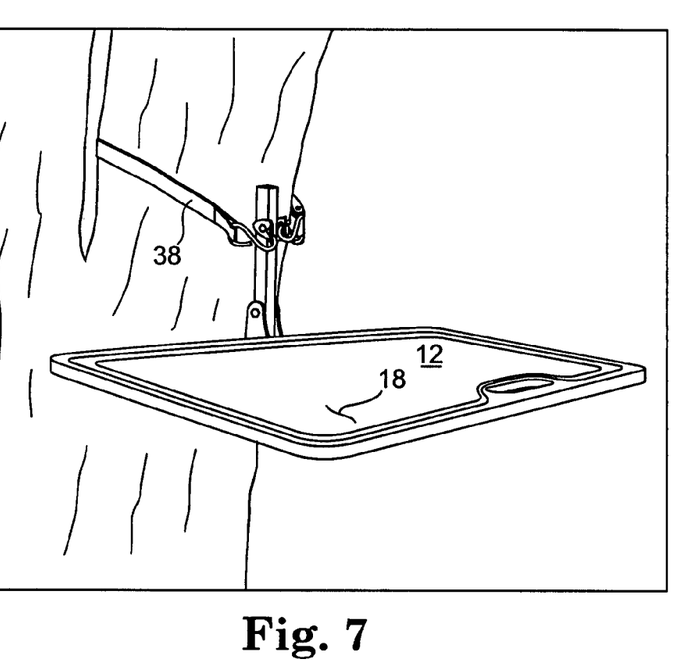
FIG. 7 is a perspective view of a portable cleaning apparatus in accordance with the present invention as supported on a vertical support comprising a tree.
Figure 8:
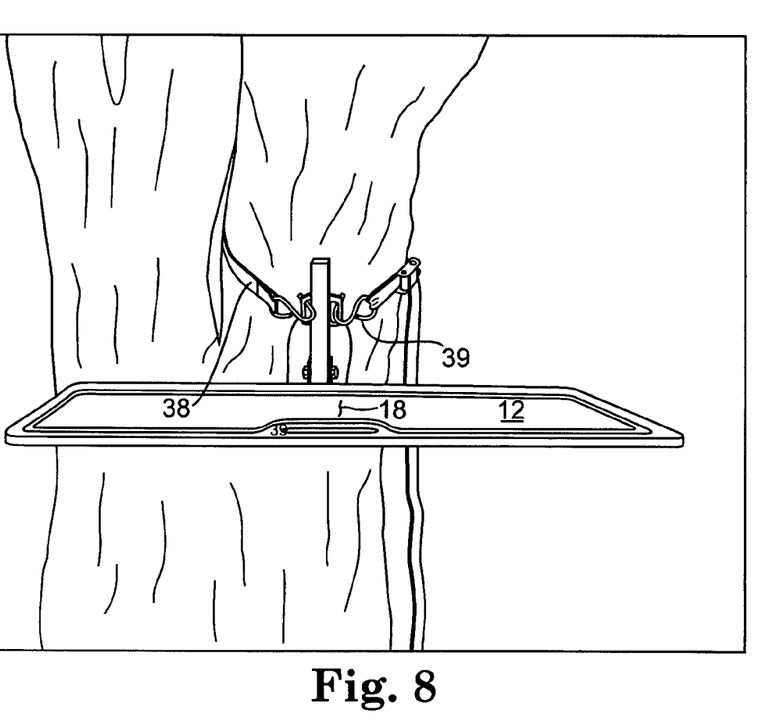
FIG. 8 is a perspective view similar to FIG. 7, but showing the portable cleaning apparatus and vertical support from a front perspective and as viewed from above the work surface board.
Figure 9:
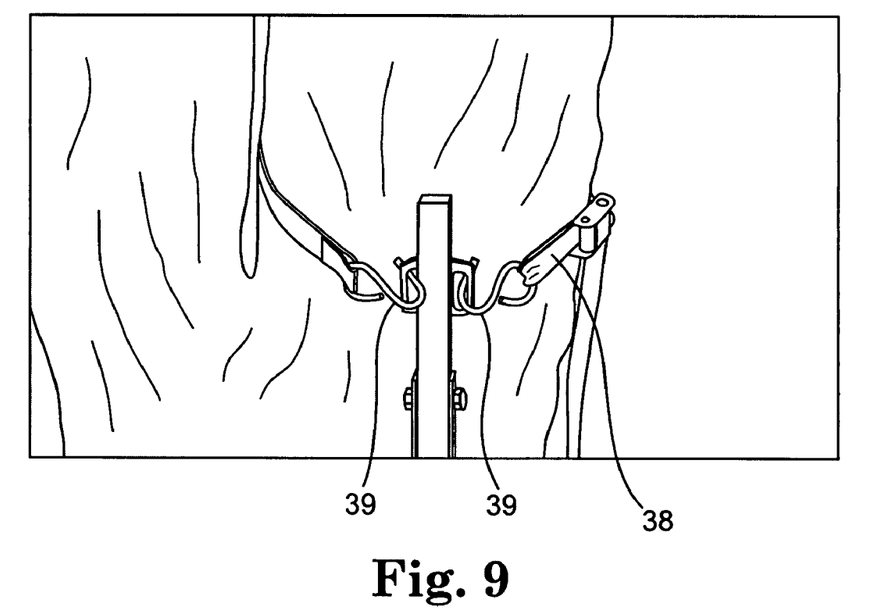
FIG. 9 is an enlarged partial view of the upper portion of the portable cleaning apparatus of FIG. 8 showing the upper end of the stanchion and connection with a lanyard as a support feature.
Figure 10:
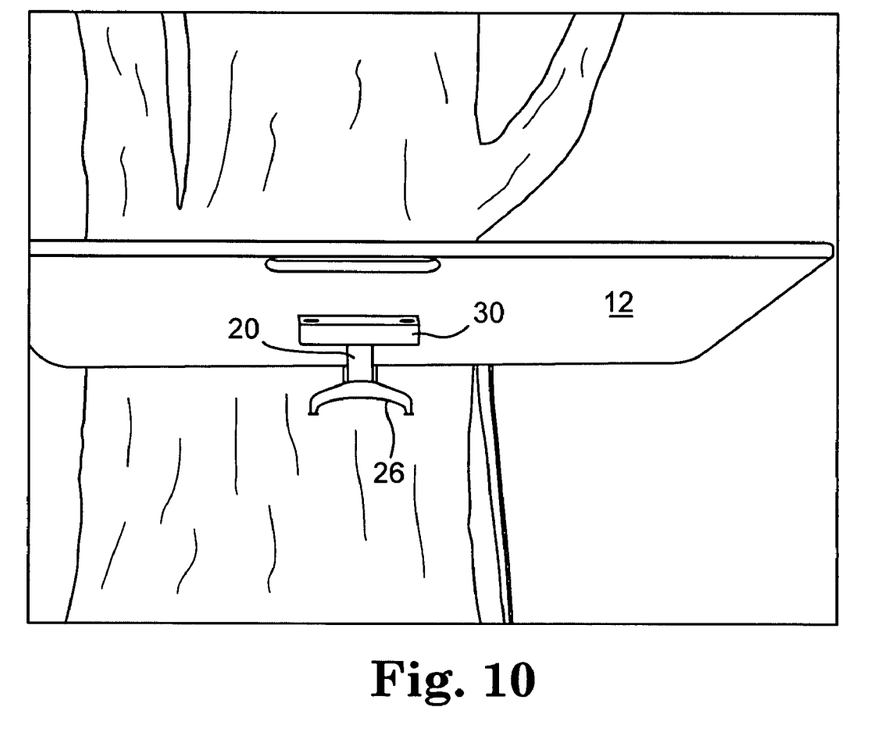
FIG. 10 is a perspective view similar to FIGS. 7 and 8, but showing the portable cleaning apparatus and vertical support from a front perspective and as viewed from below the work surface board.

Preferably also, near the top of the stanchion 16, at least some distance above the pivot 22, a connection point is provided. As shown, connector elements 32 are shown in FIG. 5 for connection through an opening through the stanchion 16 as shown in FIGS. 3 and 4 by a conventional bolt assembly 34 or the like. Again, any other connection technique can be used instead. The connector elements 32 preferably provide a connection feature, such as openings 36 shown for receiving hooks of the like of a strap or lanyard 38 described below. Where other strap features for connection are used, the mount to the stanchion could be appropriately modified as well.

A lanyard 38 is thus operatively coupled to the stanchion 16 to a point above the work surface 18 and is preferably flexible to be draped and secured about the tree to suspend the frame from the tree. Preferably, the lanyard 38 is adjustable in length to accommodate different size trees or other vertical support and may include devices for tightening the lanyard 38 to the tree, such as including a ratcheting type adjustment device as are well known for use on adjustable tie-down straps. Hooks 39 at the lanyard ends permit the strap to connected to the connector elements 32 of the stanchion 16 so that once the lanyard 38 is tightened around a tree or the like, the stanchion 16 will be held against the vertical support surface with the engagement member 26 also against the vertical support surface. As such, the frame 14 and any configured work surface board 12 can be stably positioned on a vertical support. This arrangement is advantageous in that a downward force applied to the work surface 18 will tend to push the engagement member 26 against the vertical support surface with the lanyard 38 securely in place, as opposed to prior art devices supported from below.

Other devices, whether flexible or not, are contemplated for the lanyard 38 to secure the upper portion of the stanchion 16 against a vertical support surface including any kind of assembly that engages a vertical support from a back side thereof or any other feature that actually provides a physical connection with the vertical support. With this construction, the portable cleaning apparatus 10 can be suspended by the lanyard 38 while being stabilized by the lower engagement member 26 as it contacts a tree or other vertical support. Thus, fishermen and hunters can clean their catch at camp or at the boat landing on a stable and effective work surface.

The work surface board 12 is preferably pivotally connected to the upright stanchion 16 of the support frame 14 by way of the lower frame member 20. The pivot point 22 is thus provided at a point below the operative connection of the lanyard 38 to the stanchion 16. With the lower frame member 20 fixedly connected with the work surface board 12, which lower frame member 20 can be articulated to the stanchion 16 to provide the pivotal connection 22 at a first end of the lower frame member 20, the work surface board 12 can be rotated between an open position for use and a closed position for transport and storage.

The work surface board 12 itself can have any number of features including a groove 42 about the board's perimeter for collecting waste. A handle opening 44 is also shown provided near the front edge of the work surface board 12. Features of the work surface board 12 can be provided to facilitate cutting, cleaning, waste control or otherwise as such features may be developed for work surface boards in general.

The assembly 10 is also preferably provided with a connection system, such as hook and loop connectors that can be provided through one or more openings of the cutting board, so that a refuse collection member may be mounted and demounted to the work surface board, and which may further have a refuse collection bag attached for receiving refuse of fish, fowl, game or other waste from cleaning operations for the convenient disposal of such fish, fowl or game cleaning wastes. For example, a plurality of slotted openings could be provided through the cutting board along one edge, which slots can facilitate hook and loop connector strips that may further be operatively used to support a refuse collection container or bag. An opening of sufficient size can be provided through the cutting board to permit refuse to fall through it to the ground or into a receptacle that may be supported on the ground or supported from the assembly 10 at any point and by any manner.

As a preferable further option, one or more knife receiving slots can be provided in the cutting board. For example, a slot sized to permit a knife blade through it can be provided through the cutting board so that a knife can be slid through the slot from the top and so that the knife handle will prevent the knife from passing all the way through the slot. Or, a groove or slot can extend along the surface of the cutting board, such as along an edge, so that a knife can be rested on the cutting board with the blade set into the groove or slot. Likewise, other utensils and implements can be facilitated by features that can be formed, such as by molding or machining techniques, to the cutting board feature or that can be supported therefrom or from other elements of the assembly 10.

The work surface board 12 is preferably made from a material that is suitable for cutting on a surface thereof and that cleans easily, such as a blow-molded, high molecular weight HD polyethylene (HDPE). It is contemplated that other plastics, woods, metals, ceramics, etc. can be used as well as multiple materials constructions and/or laminates to provide the work surface. High Density Polyethelene is preferred as being and approved material by both the U.S. Food and Drug Administration and the U.S.D.A. for food uses and is easily cleanable to reduce contamination by bacterial or other microbial organisms.

An alternative work surface board can incorporate integral structural features, such as ribs and/or flanges, for additional strength. Preferably, such features are provided to the bottom surface of the work surface board so as not to interfere with the work surface. Advantageously, such features can also facilitate the mounting of the lower frame member 20 as described above so that it lies within the thickness of the work surface board to provide a smoother bottom that is even better suited for ground or other horizontal surface use. It is also contemplated that the one or more elements of the frame may be made integrally with the work support board by conventional techniques like polymeric molding processes. Other preferred polymeric materials include nylon, polypropylene, ABS and polyester, which can be used as materials for constructing one or more components of the apparatus.

An attachment point for accessories can also be provided on the upright stanchion of the support frame so that any number of devices can be supported from above the work surface. For example, an adjustable beam or LCD light may be affixed to the stanchion to be directed at the work surface for added vision during night use. The provision of the stanchion as extending above the work surface 18 provides a unique feature to a work surface assembly in that any conventional or developed connection system can be incorporated to the top of the stanchion to provide easy connection with any number and kinds of attachment devices for use, removal and replacement with other attachment devices.

The present invention thus provides a portable cleaning apparatus for fish, fowl and wild game useful by recreational sportsman who often find it desirable to clean their catch shortly after being caught at camp, the boat landing or other convenient locations, where a work surface board can be supported for use at a convenient position and provide a stable platform above the ground, with upon placement in supportive engagement with a tree, pier, fence post or other vertical surfaces. The assembly can also be easily disengaged and used as it is placed on a horizontal surface as well.

What is claimed is:

1. A portable working surface apparatus for support along a surface of a vertical support structure, the portable working surface apparatus comprising a work surface board with a work surface and an upright stanchion operatively connected with the work surface board and extending away from the work surface to provide a connection point spaced from the work surface, the stanchion comprising an articulated member that is pivotally connected to a lower engagement member that is provided as a centrally positioned extension from the work surface board so as to permit pivotal movement of the articulated member relative to the lower engagement member and the work surface board, the articulated member including means to provide the connection point as spaced from the work surface, wherein the lower engagement member further comprises a pair of tines that are spaced from one another for engaging a surface of a vertical support at spaced points with a longitudinal axis of the articulated member positioned between the spaced points and at a position below the connection point.

2. The apparatus of claim 1, further comprising a lanyard connected with the connection point and for connection with the vertical support structure.

3. The apparatus of claim 1, wherein the articulated member and work surface board are articulated together so that the work surface board is pivotal with respect to the articulated member to permit the work surface board to be moved between an open position extending substantially perpendicular from the articulated member to a closed position extending substantially parallel to the extension of the articulated member.

4. The apparatus of claim 3, wherein the work surface board comprises high density polyethylene.

5. The apparatus of claim 1, wherein the lower engagement member is formed integrally with the work surface board.

6. The apparatus of claim 1, further comprising means for selectively and removably attaching accessories to the portable work surface apparatus.

7. The apparatus of claim 6, further comprising a slot provided at least partially through the thickness of the work surface board for receiving an implement on the work surface.

8. The apparatus of claim 1, further comprising an accessory attachment point on the stanchion at a position spaced from the work surface.

9. The apparatus of claim 8, further comprising a light removably connected to the stanchion at the accessory attachment point.

* * * * *

UNITED STATES PATENT AND TRADEMARK OFFICE
CERTIFICATE OF CORRECTION

PATENT NO. : 7,374,479 B2  Page 1 of 1
APPLICATION NO. : 11/372362
DATED : May 20, 2008
INVENTOR(S) : Donald C. Quinney, Glenn C. Frogner and Chistopher F. Freudenberg It is certified that error appears in the above-identified patent and that said Letters Patent is hereby corrected as shown below:

On the Title Page,
Item (76) Inventor data, please delete "Glen C. Frogner" and insert in place thereof, --Glenn C. Frogner--.

Signed and Sealed this

Sixteenth Day of December, 2008

JON W. DUDAS
*Director of the United States Patent and Trademark Office*